Nov. 17, 1931.                S. D. SWENDSEN                1,831,828
                              SANITARY FOWL FEEDER
                           Filed Dec. 21, 1927      2 Sheets-Sheet 1
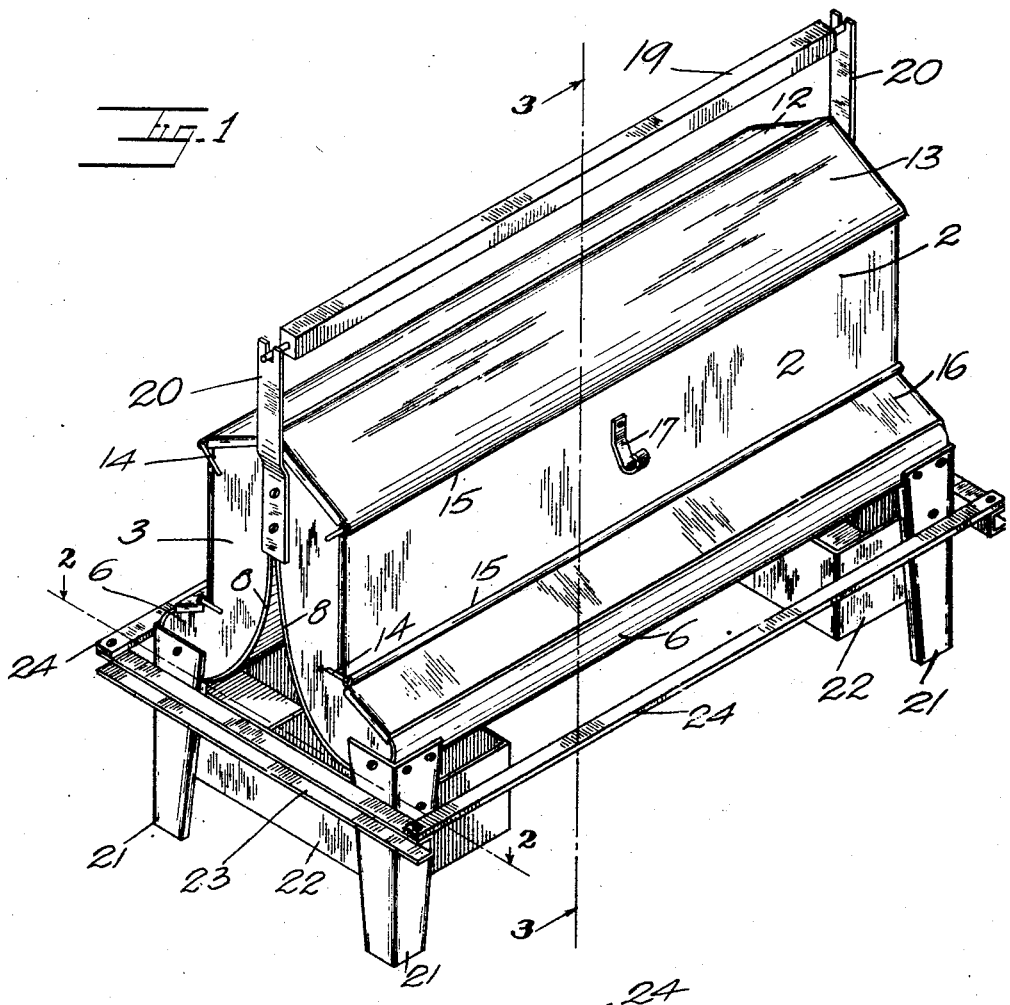
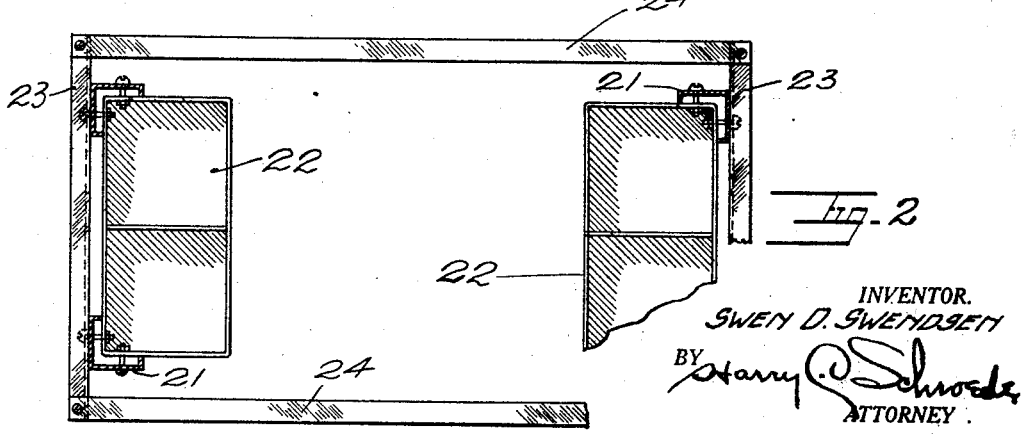
INVENTOR.
SWEN D. SWENDSEN
BY Harry C. Schroeder
ATTORNEY.

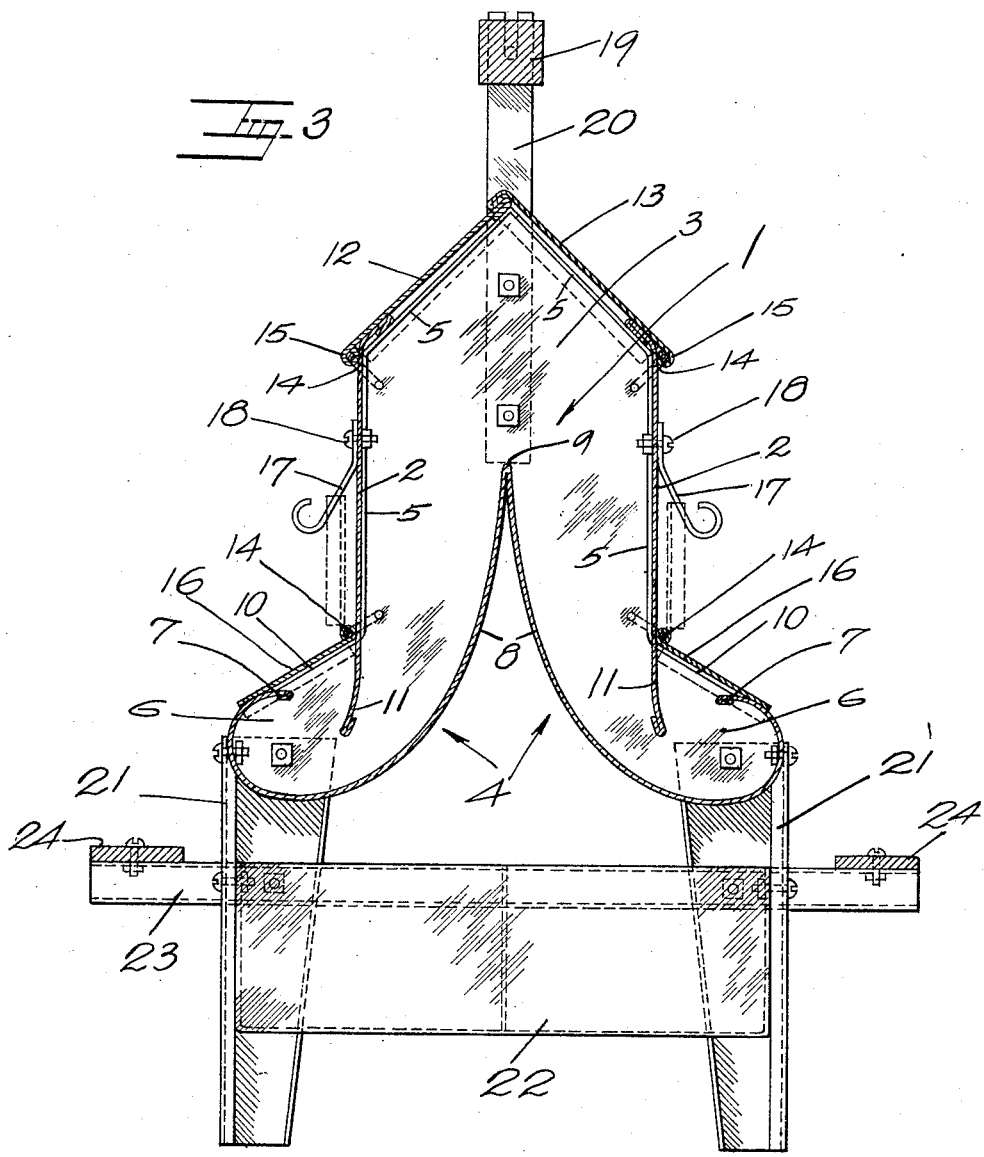

Patented Nov. 17, 1931

1,831,828

UNITED STATES PATENT OFFICE

SWEN D. SWENDSEN, OF HAYWARD, CALIFORNIA

SANITARY FOWL FEEDER

Application filed December 21, 1927. Serial No. 241,512.

The invention forming the subject matter of this application relates to sanitary fowl feeders adapted to prevent the accidental displacement of feed from the feeder.

There are a number of fowl feeders on the market. Some of them are designed so as to be more or less sanitary, but in the feeders used at present a large amount of feed is wasted on account of the feeder being open all the time and the fowl picking the feed spills the same over the ground. The feed removed from the feeder and spread all over the ground renders the yard unsanitary. Another source of the waste of feed in the feeders used at present is the uneconomical distribution of the feed and the solidifying of the feed into useless cakes. Another disadvantage of the present feeders in that the fowl may comfortably perch on the tops thereof and cause the outside of the feeders to be covered with unsanitary soil.

In every chicken yard outside the feeders a number of containers are used to hold water, charcoal, shell and other similar material which are used to provide the rough elements necessary to the proper function of the digestive organs of a fowl. These containers must be accessible to the fowls all the time and usually are scattered all over the yard and otherwise disposed at readily accessible points in the yard independently of the feeders, thereby taking up a large space.

The primary object of this invention is to provide a sanitary fowl feeder which may be closed at will and which is so constructed as to prevent the spilling of the feed therefrom during the feeding of the fowls.

Another object of the invention is to provide a sanitary, no waste fowl feeder in which means are provided for distributing the feed into the feeding channels or troughs so as to prevent the solidifying of the feed into inedible cakes.

A still further object of the invention is the provision of a sanitary, no waste fowl feeder so constructed as to prevent the roosting of the fowls on the top thereof, but to permit the perching of the fowls beside the feeding troughs.

Another object of the invention is to provide a sanitary, no waste fowl feeder which unifies in a compact structure the feeders and the different containers for holding water, charcoal, shell and the like, completely separated from each other.

A further object of the invention is to provide a combination device of the character indicated, which can be readily made of sheet metal stampings and which at the same time is light and strong.

With the above mentioned objects and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit, or without sacrificing any of the advantages of the invention.

With the foregoing objects in view reference is had to the accompanying drawings, for the illustrative embodiment of the invention, wherein;

Figure 1 is a perspective view of the fowl feeder;

Figure 2 is a sectional plan view of the auxiliary containers supported on the feeder frame, the top part of the feeder being broken away;

Figure 3 is a vertical cross section taken on the line 3—3 of Figure 1.

In carrying out my invention I make use of a feed container designated in its entirety by the numeral 1. The particular shape of the container 1 is defined by side walls 2, end plates 3 and feed distributors 4. The end plates 3 are provided with flanges 5 formed by the rebent edges of the end plates, the sides 2 are disposed on the flanges 5 and are secured thereto preferably by means of Boston seam. Each feed distributor 4 comprises a feed trough 6 having an arcuate bottom and side wall, said side wall being rebent over the trough so as to form a guard lip 7. The trough 6 is preferably made of sheet metal and it is bent so as to extend upwardly into the container 1, as at 8. The extensions 8 are inclined in such a manner as to form a distributor wedge 9 extending from end to end and at approximately equal distance from the sides 2 and in parallelism therewith. The trough 6 and the distributors 4 are attached to the end plates 3, preferably by Boston seam, or double seam.

It is to be noted that the shape of each end plate 3 conforms to the outline of the distributors 4 and the trough 6 and an inclined edge 10 of each end plate 3 is tangential to the outside of the arcuate trough opposite the open top thereof. The lower ends 11 of the sides 2 extend into the troughs 6 and are bent outwardly toward the opening thereof. Thus the upper end of the container 1 functions as a hopper, the lower end thereof distributes the feed to the opposite troughs by means of the distributor wedge 9. The passage of the feed is somewhat obstructed by the extended ends 11 of the sides 2, at the same time the extended ends 11 shield the feed in the container 1. The top opening of the trough 6 is just large enough to allow the fowl to pick the feed out of the trough but the guard lip 7 prevents the spilling of the feed outside of the trough and the extended ends 11 obviate the possibility of soiling the feed inside of the container 1. The arcuate shape of the trough 6 also prevents the roosting of the fowls thereon when picking the feed therefrom.

In order to seal the moisture in the feed, covers 12 and 13 are secured to the top of the container 1 by means of hinges 14. Said hinges consist of a bent and rebent rod, a straight portion thereof extending the full length of a bearing 15 at an edge of the covers 12 and 13. The ends of said rod are rebent and are rotatably supported in the end plates 3. To completely seal the cover of the container 1 cover 13 is rebent so as to overlap the free edge of the cover 12 and rests thereon. The covers are also supported on the flanges of the end plates 3.

A trough cover 16 is pivotally secured to the container 1 by means of hinges similar to the hinges 14, heretofore described. The trough cover 16 extends from the sides 2 tangentially to the top of the arcuate trough 6 and overlaps the guard lip 7. Said trough covers also rest upon the inclined edges 10 of the end plates 3. When the trough covers 16 are lowered into the position shown in full lines in Figure 3 any access to the feed in the troughs is made impossible, thereby preventing the waste of the feed by rats, or the like. When it is desirable to allow the fowl an access to the feed the trough covers 16 are opened up by turning the same around the hinges 14 and by bringing the same into the position shown in dotted lines in Figure 3, in which position said trough covers are substantially in parallelism with the sides 2. The trough covers are held in position by means of catches 17 pivotally secured to the sides 2 by means of bolts 18. Each catch 17 is so shaped that it may be readily grasped by hand and turned out of the way of the trough cover 16 when it is so desired, but when the trough cover 16 is open and the catch 17 is turned downwardly said cover is thereby supported in its opened position.

In order to prevent the roosting of the fowl above the covers 12 and 13 a bar 19 of a rectangular cross section is rotatably supported in brackets 20 which in turn are fixedly secured to the end plates 3. The bar 19 is so spaced from the top of the cover 13 as to prevent the roosting of the fowl below the bar. When the fowl flies to the bar 19 and tries to roost thereon the weight of the fowl rotates the bar 19 in the brackets 20, thereby throwing the fowl out of balance.

In operation the container 1 is filled with feed thru the hopper portion thereof after the covers 12 and 13 are swung open. The feed dumped in the hopper is divided by the distributor wedge 9 and it flows below the extended ends 11 into the troughs 6, filling up the same. The covers 12 and 13 and the trough covers 16 are usually closed. When the feeding time comes the trough covers 16 are opened and held in that position by the pivoted catches 17. Usually the trough covers are open all day long and are closed at night.

The device heretofore described may be set directly on the ground so as to permit the fowl to pick the feed from the troughs 6 when standing on the ground.

In order to provide a still more compact feeding unit for chicken yards, the feeder heretofore described is supported on four legs 21, the legs being removably secured to the four corners of the troughs 6, as it is clearly shown in Figure 1. Thus a space is provided between the ground and the bottom of the feeder in which space a plurality of pans 22 are disposed, said pans being supported on the legs 21. The pans 22 are partitioned and in the different sections thereof are disposed charcoal, shell or other material used in feeding fowl. The pans 22 are usually open all the time, even when the troughs 6 are covered. Channels 23 extend transversely beyond the legs 21 and are supported thereon. Roosts 24 are secured to the outer ends of the channels 23 and extend in parallelism and below the troughs 6 at such a distance as to allow the fowl to pick the feed out of the trough while standing on the roost.

It is evident that the feeder heretofore described may be readily adapted to different size fowls by simply changing the distance between the roosts 24 and the troughs 6, which involves the securing of the channels 23 to the legs 21 at the points required.

It will be recognized that a particularly compact fowl feeder unit is provided in which the feed is distributed into the opposite troughs 6 by the distributor wedge 9 and the feed is well protected from the outside by the extended ends 11 so as to provide but a limited access into the troughs 6. The rebent edge 7 prevents the spilling of the feed when the fowl is picking thru the top opening of the trough 6. A large amount of waste is also eliminated by the use of the pivoted trough cover 16 which is kept closed all the time when the fowls are not being fed. The arcuate shape of the trough 6 and the rotatable bar 19 prevent the fowls to perch on the feeder itself.

The arrangement of the partitioned pans 22 below the feeder renders the unit still more compact. When the feeder is provided with said pans and supported on the legs 21 instead of on the ground the roosts 24 are the only places adjacent to the troughs on which the fowls may rest or stand while feeding. Possibility of the soiling of the top of the feeder is almost entirely eliminated; therefore, the feeder is not only economical but it is extremely sanitary. As the container 1 is closed on all sides the moisture is sealed in the feed, thus the caking of the feed is fully obviated. As the parts of the feeder and the support therefor are held together by bolts and nuts, the feeder may be readily assembled or dissembled as required.

Having thus described my invention, what I now claim as novel and desire to secure by Letters Patent, is:

1. A fowl feeder comprising a hopper having a forwardly projecting trough provided with a lip, the back and bottom of said hopper and bottom and lip of said trough constituting a transition curve beginning at the lip and terminating adjacent the top of the hopper, the front of said hopper being spaced from said lip and vertically disposed.

2. A fowl feeder comprising a hopper and a trough projecting forwardly therefrom, a curved lip continuing into a transition spiral forming the bottom of said trough and hopper and the back of said hopper, the front wall of said hopper being spaced from said lip and vertically disposed, and a tongue depending from the front wall to a level below said lip, and an anti-roost cover and a perch for said hopper.

3. A fowl feeder comprising a hopper and a trough projecting forwardly therefrom, a curved lip superposed over the front portion of said trough and continuing into a transition spiral forming the front and bottom of said trough, and bottom and back of said hopper, a vertical front spaced from said lip and having a depending tongue extending below the level of said lip, and a sloping cover for said hopper.

4. A fowl feeder comprising a hopper and a trough projecting forwardly therefrom, the front of said trough being semicircular in form and disposed vertically and continuing into a transition spiral forming the bottom and back of said hopper, a depending tongue substantially dividing said trough from said hopper, a vertical front for said hopper, a hinged cover for said trough, and a sloping cover for said hopper.

5. A fowl feeder comprising a hopper having straight, vertical fronts and ends, and substantially divided by the terminal ends of opposition transition spirally formed partition and bottoms, continuing into semi-cylindrical fronts and lips beyond said hopper fronts forming thereby troughs with encroaching lips, baffles extending downwardly from said hopper fronts below the level of said lips, covers hingedly connected to the hopper fronts and adapted to rest on the lips, and a ridge cover for said hopper.

6. A fowl feeder comprising a hopper having vertical fronts and ends, a ridge type cover, a pair of continuous oppositely disposed curvilinear members forming a partition in said hopper, bottoms for said hoppers and bottoms, fronts and lips of trough extending forwardly of said hopper fronts, legs fixed to the ends of said troughs, and perches supported by said legs below said troughs and parallel thereto.

7. A fowl feeder comprising a hopper having vertical fronts and ends, a ridge type cover, a partition formed by two oppositely disposed transition spirally formed members, said partition continuing to form bottoms and troughs with encroaching lips beyond the fronts thereof, hinged covers for said troughs, depending baffles extending downwardly from said fronts, below the lip level, legs fixed to the ends of said troughs, supporting members transversely fixed to said legs, perches mounted on said supporting members, below and parallel to said troughs and additional feed boxes supported transversely between said legs.

8. A fowl feeder having a straight front hopper provided with a forwardly projecting trough; a sheet of flexible material formed with a continuous curve, one end thereof being semi-cylindrical and continuing therefrom to the approximate form of a transition curve, said semi-cylindrical portion forming a lip and front for said trough, the terminal of said transition curve comprising the upper edge of a back or partition, said front extending below the lip level.

In testimony whereof I affix my signature.

SWEN D. SWENDSEN.